(12) United States Patent
Chung

(10) Patent No.: US 8,786,974 B2
(45) Date of Patent: Jul. 22, 2014

(54) METHOD AND APPARATUS FOR CONTROLLING A MOTOR

(75) Inventor: Da-woon Chung, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 537 days.

(21) Appl. No.: 13/053,647

(22) Filed: Mar. 22, 2011

(65) Prior Publication Data

US 2011/0235206 A1   Sep. 29, 2011

(30) Foreign Application Priority Data

Mar. 23, 2010  (KR) .................. 10-2010-0025875

(51) Int. Cl.
*G11B 15/18*  (2006.01)
*H02P 6/10*   (2006.01)
*H02P 23/00*  (2006.01)
*G11B 19/28*  (2006.01)

(52) U.S. Cl.
CPC ............ *G11B 19/28* (2013.01); *H02P 23/0027* (2013.01)
USPC ...................................... 360/71; 318/400.23

(58) Field of Classification Search
None
See application file for complete search history.

(56) References Cited

U.S. PATENT DOCUMENTS

| 5,155,422 | A | * | 10/1992 | Sidman et al. | ................ | 318/560 |
| 5,614,676 | A | * | 3/1997 | Dutt et al. | ........................ | 73/660 |
| 6,310,747 | B1 | * | 10/2001 | Emo et al. | .................. | 360/97.21 |
| 7,466,101 | B2 | * | 12/2008 | Takaishi | ........................ | 318/638 |

FOREIGN PATENT DOCUMENTS

| JP | 58-137169 | 8/1983 |
| JP | 01-211369 | 8/1989 |
| JP | 05-174511 | 7/1993 |
| JP | 10-064184 | 3/1998 |

* cited by examiner

*Primary Examiner* — K. Wong
(74) *Attorney, Agent, or Firm* — Volentine & Whitt, PLLC

(57) ABSTRACT

A method and apparatus for adaptively controlling a motor considering a state of disturbance applied to a system. The method includes changing a frequency bandwidth of a frequency response characteristic in a motor control system according to a state of disturbance applied to the motor control system, and controlling a speed of the motor by applying the changed frequency bandwidth to the motor control system.

19 Claims, 10 Drawing Sheets

METHOD AND APPARATUS FOR CONTROLLING A MOTOR

CROSS-REFERENCE TO RELATED APPLICATIONS

A claim of priority is made to Korean Patent Application No. 10-2010-0025875, filed on Mar. 23, 2010, in the Korean Intellectual Property Office, the subject matter of which is hereby incorporated by reference.

BACKGROUND

The inventive concept relates to a method and apparatus for controlling a motor, and more particularly, to a method and apparatus for adaptively controlling a motor by considering a state of disturbance applied to a system.

A disk drive is a type of data storage device. A disk drive rotates a disk using a spindle motor, and writes data into disk or reads data from the disk by using a head. The manner in which the spindle motor is controlled affects data reading and/or writing performance of the disk drive.

SUMMARY

Embodiments of the inventive concept provide a method of adaptively controlling a motor by considering a state of disturbance applied to a system. Embodiments of the inventive concept also provide an apparatus for adaptively controlling a motor by considering a state of disturbance applied to a system. Embodiments of the inventive concept also provide a disk drive using a method of adaptively controlling a motor that rotates a disk by considering a state of disturbance applied to a system. In addition, embodiments of the inventive concept provide a storage medium on which program code is recorded for executing a method of adaptively controlling a motor by considering a state of disturbance applied to a system.

According to an aspect of the inventive concept, there is provided a method of controlling a motor in a head disk assembly. The method includes changing a frequency bandwidth of a frequency response characteristic in a motor control system according to a state of a disturbance applied to the motor control system, and controlling a speed of the motor by applying the changed frequency bandwidth to the motor control system.

The motor may include a spindle motor for rotating a disk. Also, the method may further include determining the state of disturbance using at least one factor value based on at least one of a disturbance value detected by a shock detecting sensor, an amount of interference generated between a head and a disk, a difference between a measured speed of the motor and a target speed, and a jitter value of a spindle motor. The frequency bandwidth of the frequency response characteristic in the motor control system may be changed based on the determination.

Changing the frequency bandwidth may include increasing the frequency bandwidth in proportion to an amplitude of the disturbance applied to the motor control system. Changing the frequency bandwidth may include setting the frequency bandwidth to a first frequency bandwidth when an amplitude of the disturbance applied to the motor control system exceeds an initially set threshold value, and otherwise setting the frequency bandwidth to a second frequency bandwidth, which is less than the first frequency bandwidth.

Changing the frequency bandwidth may include setting the frequency bandwidth to a first frequency bandwidth while a disk drive having a ramp loading system is in a ramp loading period, and setting the frequency bandwidth to a second frequency bandwidth smaller than the first frequency bandwidth while the disk drive is in a data read or write operation period. Changing the frequency bandwidth may include setting the frequency bandwidth to a first frequency bandwidth until a first seek operation according to a ramp loading operation of a disk drive having a ramp loading system is completed, and setting the frequency bandwidth to a second frequency bandwidth smaller than the first frequency bandwidth after the first seek operation is completed.

According to another aspect of the inventive concept, there is provided an apparatus for controlling a motor, including a speed detector for detecting a speed of the motor, multiple motor controllers, a selector, and a motor driver. Each of the motor controllers generates a speed control signal to reach a target speed based on the detected speed of the motor, according to frequency response characteristics of different frequency bandwidths. The selector selects one of the motor controllers based on a disturbance that generates a load variation of the motor. The motor driver generates a driving current based on the speed control signal generated by the motor controller selected by the selector, and applies the generated driving current to the motor.

The selector may select a motor controller that has a frequency response characteristic of a relatively large frequency bandwidth that is proportional to an amplitude of the disturbance that generates the load variation of the motor.

The motor controllers may include a first motor controller having a frequency response characteristic of a first frequency bandwidth, and a second motor controller having a frequency response characteristic of a second frequency bandwidth smaller than the first frequency bandwidth. The selector may select the first motor controller when an amplitude of the disturbance generating the load variation of the motor exceeds a threshold value, and may select the second motor controller when the amplitude of the disturbance generating the load variation of the motor does not exceed the threshold value. The amplitude of the disturbance generating the load variation of the motor exceeding the threshold value may result form a ramp loading executing condition in a disk drive having a ramp loading system.

The selector may selects one of the motor controllers based on a state of the disturbance determined using at least one factor value based on at least one of a disturbance value detected by a shock detecting sensor, an amount of interference generated between a head and a disk, a difference between a measured speed of the motor and a target speed, and a jitter value of a spindle motor.

According to another aspect of the inventive concept, there is provided an apparatus for controlling a motor, including a speed detector for detecting a speed of the motor, a subtractor for subtracting a speed error corresponding to a difference between the detected speed of the motor and a target speed, and a speed controller for generating a speed control signal corresponding to the speed error. The apparatus further includes a filter for changing a frequency bandwidth based on a disturbance generating a load variation of the motor, and for filtering and outputting the speed control signal according to a frequency response characteristic of the changed frequency bandwidth, and a motor driving unit for generating a driving current corresponding to the speed control signal filtered and output by the filter, and for supplying the driving current to the motor.

The filter may include low pass filter. The filter may filter according to a frequency response characteristic of a first frequency bandwidth when an amplitude of the disturbance generating the load variation of the motor exceeds a threshold value, and may filter according to a frequency response characteristic of a second frequency bandwidth smaller than the first frequency bandwidth when the amplitude of the disturbance generating the load variation of the motor does not exceed the threshold value. The amplitude of the disturbance generating the load variation of the motor exceeding the threshold value may result from a ramp loading executing condition in a disk drive having a ramp loading system.

According to another aspect of the inventive concept, there is provided a disk drive including a disk for storing information, a spindle motor for rotating the disk, and a spindle motor controller for changing a frequency bandwidth based on a disturbance condition generating a load variation of the spindle motor, and for generating a speed control signal based on a difference between a speed of the spindle motor and a target speed by applying a frequency response characteristic of the changed frequency bandwidth. The disk drive further includes a spindle motor driving unit for generating a driving current corresponding to the speed control signal and for applying the generated driving current to the spindle motor.

The frequency bandwidth may be determined to be a first frequency bandwidth when the amplitude of the disturbance condition changing the load of the spindle motor exceeds a threshold value, and may be determined to be a second frequency bandwidth smaller than the first frequency bandwidth when the amplitude of the disturbance condition changing the load of the spindle motor does not exceed the threshold value.

The spindle motor controller may determine the frequency bandwidth to be a first frequency bandwidth during a ramp loading executing period, where a head mounted on a ramp structure of the disk drive is moved onto the disk. The spindle motor controller may determine the frequency bandwidth to be in a second frequency bandwidth smaller than the first frequency bandwidth after the ramp loading executing period.

According to another aspect of the inventive concept, there is provided a computer readable storage medium on which program code is recorded for executing a method of controlling a motor. The method includes changing a frequency bandwidth of a frequency response characteristic in a motor control system according to a state of disturbance applied to the motor control system, and controlling a speed of the motor by applying the changed frequency bandwidth to the motor control system.

BRIEF DESCRIPTION OF THE DRAWINGS

The embodiments of the inventive concept will be described with reference to the attached drawings, in which.

DETAILED DESCRIPTION OF THE EMBODIMENTS

Figure 1:
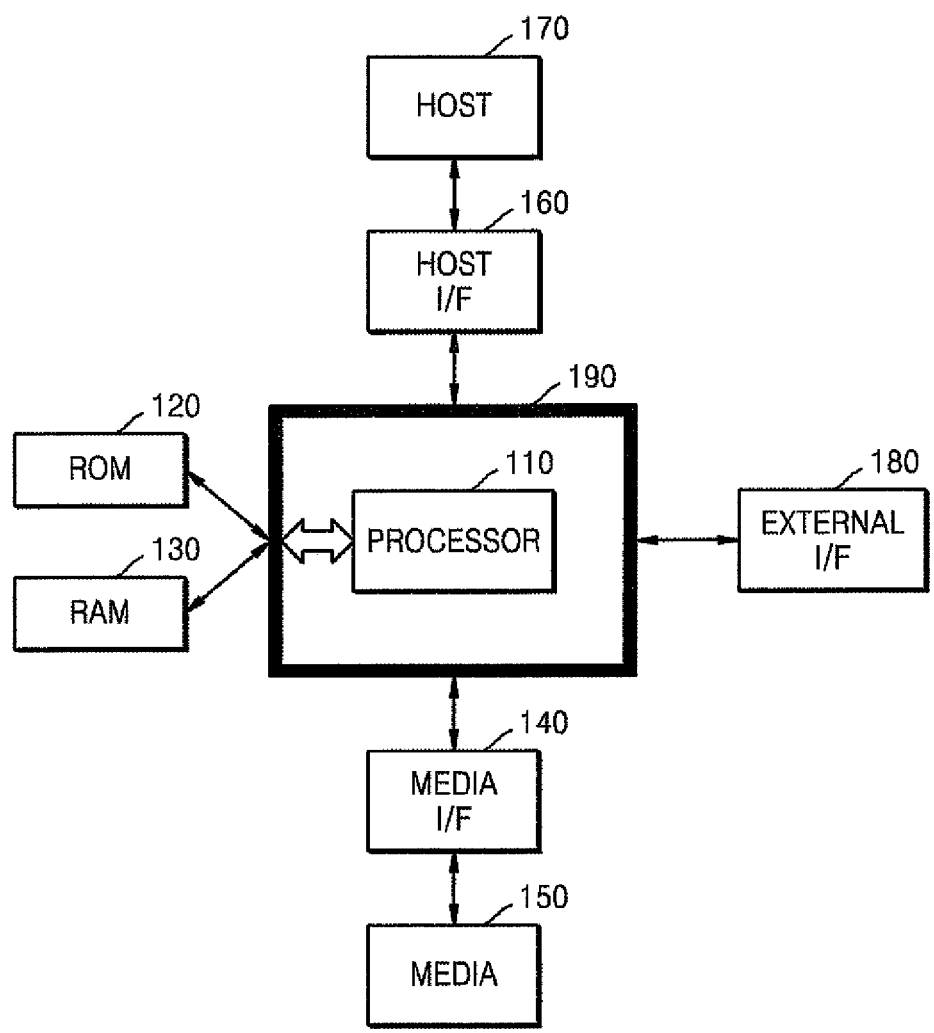
FIG. 1 is a block diagram of a data storage device, according to an embodiment of the inventive concept.

The invention concept will now be described more fully with reference to the accompanying drawings, in which exemplary embodiments of the inventive concept are shown. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept.

The inventive concept will now be described more fully with reference to the accompanying drawings, in which exemplary embodiments of the inventive concept are shown. Unless otherwise noted, like reference numerals denote like elements throughout the attached drawings and written description.

FIG. 1 is a block diagram of a data storage device, according to an embodiment of the inventive concept.

Referring to FIG. 1, the data storage device includes a processor 110, a read only memory (ROM) 120, a random access memory (RAM) 130, a media interface (I/F) 140, a media 150, a host I/F 160, a host device 170, an external I/F 180, and a bus 190.

The processor 110 interprets commands and controls elements of the data storage device according to the command interpretations. The processor 110 includes a code object management unit (not shown), and loads a code object stored in the media 150 into the RAM 130 using the code object management unit. The processor 110 loads code objects for executing methods of controlling a motor, examples of which are shown in FIGS. 9 through 11, into the RAM 130.

Figure 9:
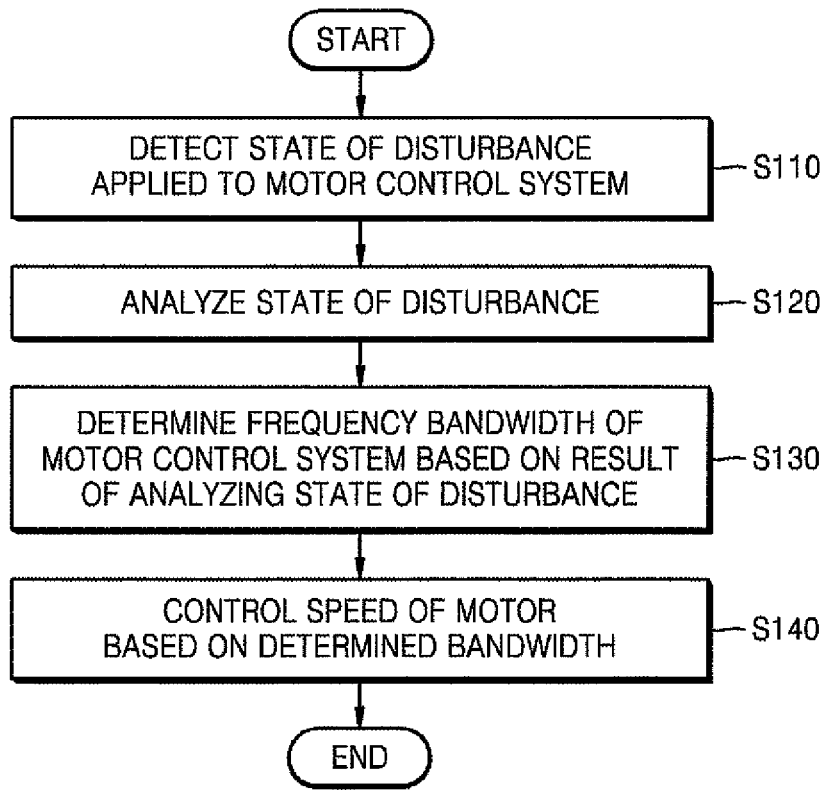
FIG. 9 is a flowchart illustrating a method of controlling a motor, according to an embodiment of the inventive concept.
Figure 10:
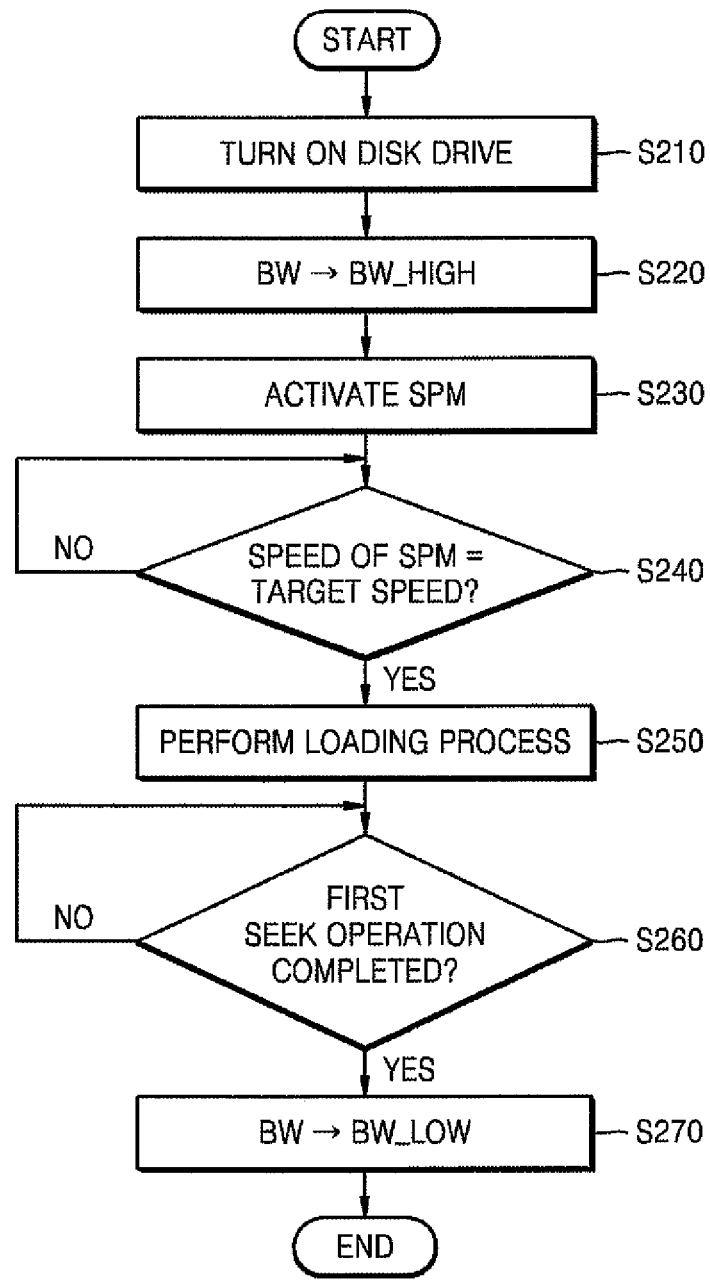
FIG. 10 is a flowchart illustrating a method of controlling a motor, according to another embodiment of the inventive concept.
Figure 11:
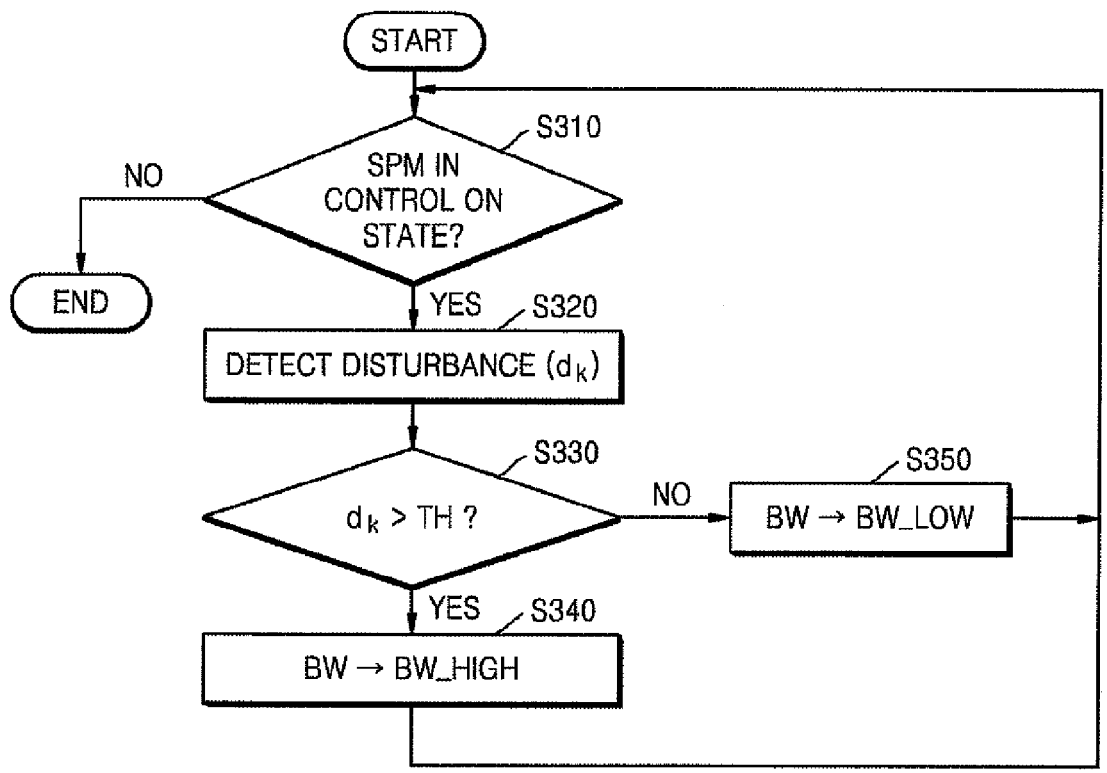
FIG. 11 is a flowchart illustrating a method of controlling a motor, according to another embodiment of the inventive concept.

The processor 110 is then able to execute a task of controlling the motor according to one or more of the methods of FIGS. 9 through 11, for example, using the code objects loaded into the RAM 130, and to store information required to execute the methods in the media 150 or the ROM 120. Examples of such information include a parameter value related to a frequency bandwidth change of a motor control system, and a threshold value TH of a disturbance used to determine the frequency bandwidth change. Various methods of controlling a motor performed by the processor 110 will be described in detail with reference to FIGS. 9 through 11, below.

Program codes and data required for operating the data storage device are stored in the ROM 120. The program codes and data stored in the ROM 120 and/or the program codes and data stored in the media 150, are loaded into the RAM 130 under control of the processor 110. The media 150 may include a disk as a main storage medium of the data storage device. The data storage device may include a disk drive. A detailed structure of a head disk assembly 100, including a disk and a head in a disk drive is illustrated in FIG. 3.

Figure 3:
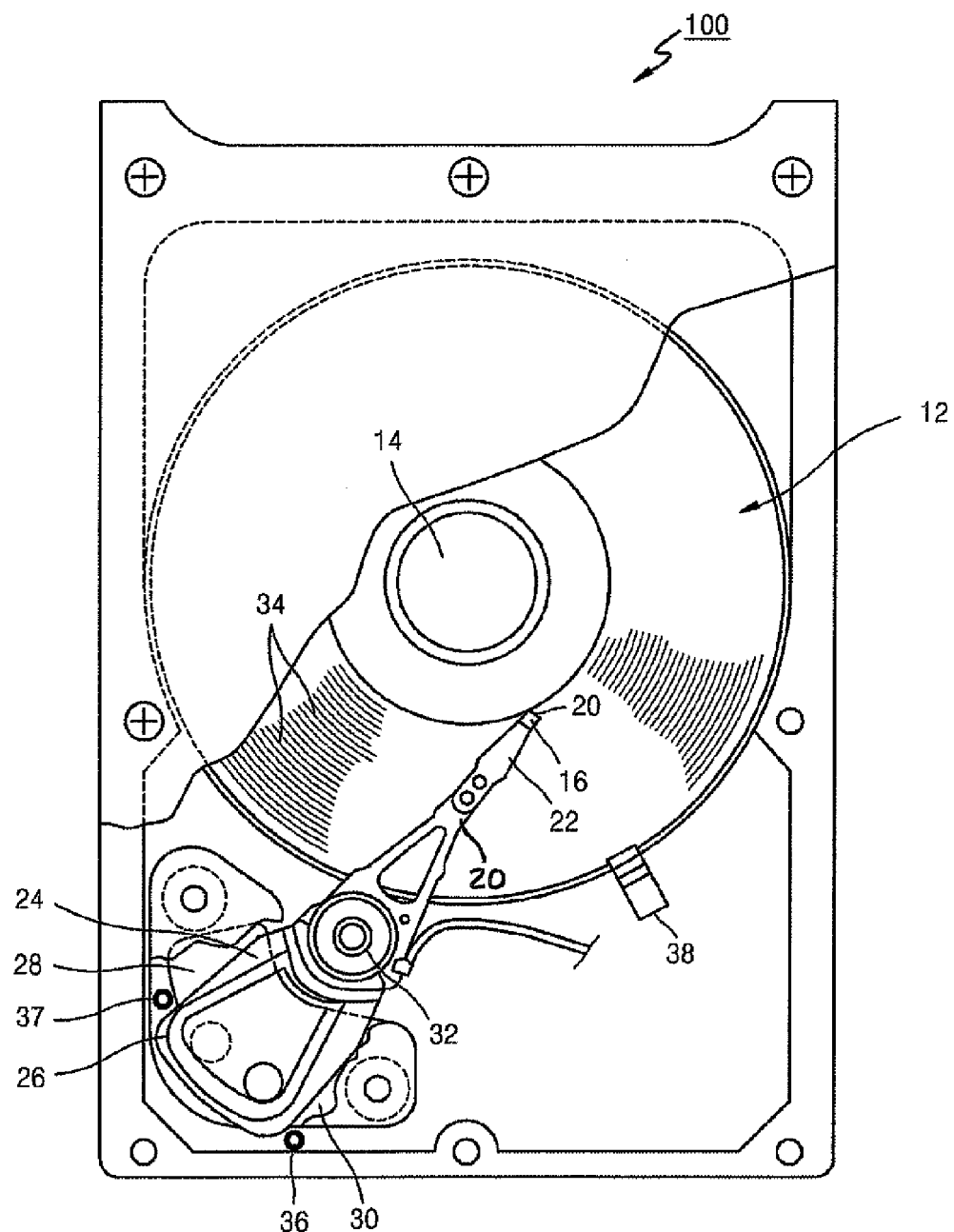
FIG. 3 is a plan view of a head disk assembly of a disk drive, according to an embodiment of the inventive concept.

FIG. 3 is a plan view of the head disk assembly 100 of a disk drive, according to an embodiment of the inventive concept. Referring to FIG. 3, the head disk assembly 100 includes at least one disk 12 that is rotated by a spindle motor (SPM) 14. The disk drive also includes a head 16 that is located adjacent to a surface of the disk 12.

While the disk 12 is being rotated, the head 16 senses a magnetic field of the disk 12 or magnetizes the disk 12 to read or write information from/to the disk 12. In general, the head 16 is associated with the surface of the disk 12. Although one head 16 is illustrated in FIG. 3, it is understood that the head 16 may include a writing head for magnetizing the disk 12 and a reading head for sensing the magnetic field of the disk 12. The reading head may include a magneto-resistive (MR) device, for example. The head 16 may be referred to as a transducer.

The head 16 may be mounted on a slider 20. The slider 20 generates an air bearing between a surface of the head 16 and the surface of the disk 12. The slider 20 is integrated with a head gimbal assembly 22. The head gimbal assembly 22 is attached to an actuator arm 24 having a voice coil 26. The voice coil 26 is disposed adjacent to a magnetic assembly 28 to define a voice coil motor (VCM) 30. A current supplied to the voice coil 26 generates torque for rotating the actuator arm 24 with respect to a bearing assembly 32. Due to the rotation of the actuator arm 24, the head 16 is moved across the surface of the disk 12.

The head disk assembly 100 may have a crash stop system to limit the movable range of the head 16. The crash stop system includes an inner crash stop rubber 36 for limiting movement of the head 16 in an inner periphery direction of the disk 12 to a maximum permitted location, and an outer crash stop rubber 37 for limiting movement of the head 16 in an outer periphery direction of the disk 12 to a maximum permitted location. Locations of the inner crash stop rubber 36 and the outer crash stop rubber 37 are determined so that the head 16 is guaranteed to move up to a certain location outside a data area of the disk 12. When the head 16 reaches the maximum permitted location in the inner periphery direction of the disk 12, the actuator arm 24 attached to the head 16 contacts the inner crash stop rubber 36. Accordingly, the head 16 is no longer able to move in the inner periphery direction of the disk 12. In a similar manner, when the head 16 reaches the maximum permitted location in the outer periphery direction of the disk 12, the actuator arm 24 attached to the head 16 contacts the outer crash stop rubber 37. Accordingly, the head 16 is no longer able to move in the outer periphery direction of the disk 12.

In a loading mode of the disk drive, the head 16 is moved from a parking area located outside the data area of the disk 12 to the data area of the disk 12. In an unloading mode of the disk drive, the head 16 is moved from the data area of the disk 12 to the parking area located outside the data area of the disk 12.

Figure 5:
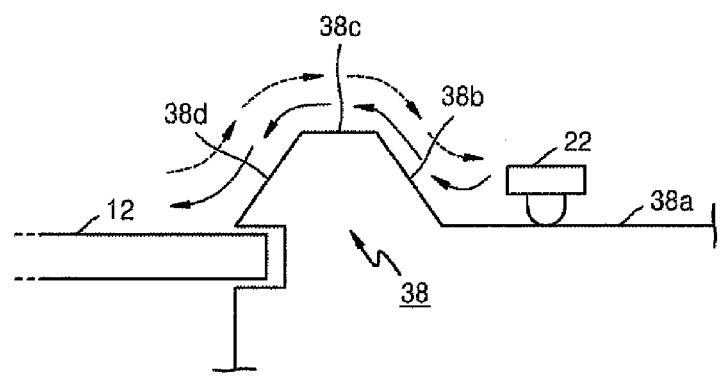
FIG. 5 is a diagram illustrating operation of a ramp parking unit of FIG. 3.

The head disk assembly 100 may also include a ramp parking unit 38 for parking the head 16 outside the data area of the disk 12 in a power off mode or a power save mode of the disk drive. The ramp parking unit 38 is disposed in an outer periphery area outside the data area of the disk 12. FIG. 5 is a diagram illustrating operation of the ramp parking unit 38 of FIG. 3.

As shown in FIG. 5, the ramp parking unit 38 has inclined surfaces 38b and 38d, and flat surfaces 38a and 38c. A ramp loading/unloading method will now be described with reference to FIG. 5.

Referring to FIG. 5, dashed arrows denote an unloading direction of the head 16 and solid arrows denote a loading direction of the head 16. First, in the unloading mode, the head gimbal assembly 22, to which the head 16 is attached, moves in the direction indicated by the dashed arrows from the data area of the disk 12 according to a rotation of the actuator arm 24 to contact a parking surface 38a of the ramp parking unit 38. Referring back to FIG. 3, when the head gimbal assembly 22 is located on the parking surface 38a of the ramp parking unit 38, the actuator arm 24 contacts the outer crash stop rubber 37.

In the loading mode, the head gimbal assembly 22, to which the head 16 is attached, moves in the direction indicated by the solid arrows from the parking surface 38a of the ramp parking unit 38 according to a rotation of the actuator arm 24 to be located in the data area of the disk 12.

Referring back to FIG. 3, data may be stored in annular tracks 34 of the disk 12. Each of the annular tracks 34 includes multiple sectors. One track 34 includes servo information fields for storing servo information and data sectors for storing data. Multiple data sectors may be included between the servo information fields. Alternatively, a single data sector may be included between the servo information fields.

A preamble, a servo synchronization indication signal, a gray code, and a burst signal are recorded on the servo information fields. The preamble provides clock synchronization while reading servo information, and also provides a uniform timing margin by providing a gap in front of a servo sector. Also, the preamble is used to determine a gain of an automatic gain control (AGC) circuit. The servo synchronization indication signal includes a servo address mark (SAM) and a servo index mark (SIM). The SAM is a signal indicating a beginning of a sector, and the SIM is a signal indicating a beginning of a first sector in the track 34. The gray code provides track information, and the burst signal is a signal used to control the head 16 to follow the center of the annular track 34. The burst signal may include four patterns, such as A, B, C and D, for example. These four patterns may be combined to generate a position error signal (PES) used for controlling the head 16 to follow the center of the annular track 34.

Referring again to FIG. 3, a logic block address is allocated in a writable area of the disk 12. The logic block address of the disk drive is converted to cylinder/head/sector information to designate the writable area of the disk 12. The disk 12 is divided into a maintenance cylinder area that is not accessible by a user, and a data area that is accessible by the user. The maintenance cylinder area is also referred to as a system area. In the maintenance cylinder area, various types of information required to control the disk drive are stored, such as information required to control the floating height of the head 16.

The head 16 is moved across the surface of the disk 12 to read data from or write data to various tracks. Multiple code objects for enabling the disk drive to implement various functions may be stored in the disk 12. For example, a code object for executing a MP3 player function, a code object for executing a navigation function, and a code object for executing various video games may be stored in the disk 12.

Referring again to FIG. 1, the media I/F 140 enables the processor 110 to access the media 150 to write or read data. The media I/F 140 in the data storage device, which may be implemented as a disk drive, includes a servo circuit for controlling the head disk assembly 100 and a read/write channel circuit for processing signals to read or write data.

The host I/F 160 performs data transmission/reception to/from the host device 170, which may be a personal computer, for example. The host I/F 160 may be any standardized interface, such as a serial advanced technology attachment (SATA) interface, a parallel advanced technology attachment (PATA) interface, or a universal serial bus (USB) interface.

The external I/F 180 performs data transmission/reception to/from an external device (not shown) via an input/output terminal installed in the data storage device. Examples of the external I/F 180 include any standardized interface, such as an accelerated graphics port (AGP) interface, a USB interface, an IEEE1394 interface, a personal computer memory card international association (PCMCIA) interface, a local area network (LAN) interface, a Bluetooth interface, a high definition multimedia interface (HDMI), a programmable communication interface (PCI), an industry standard architecture (ISA) interface, a peripheral component interconnect-express (PCI-E) interface, an Express Card interface, an SATA interface, a PATA interface, or a serial interface. The bus 190 transfers data between the elements of the data storage device.

Hereinafter, a software operation system of a hard disk drive (HDD), which is an example of the data storage device, is described with reference to FIG. 2.

Figure 2:
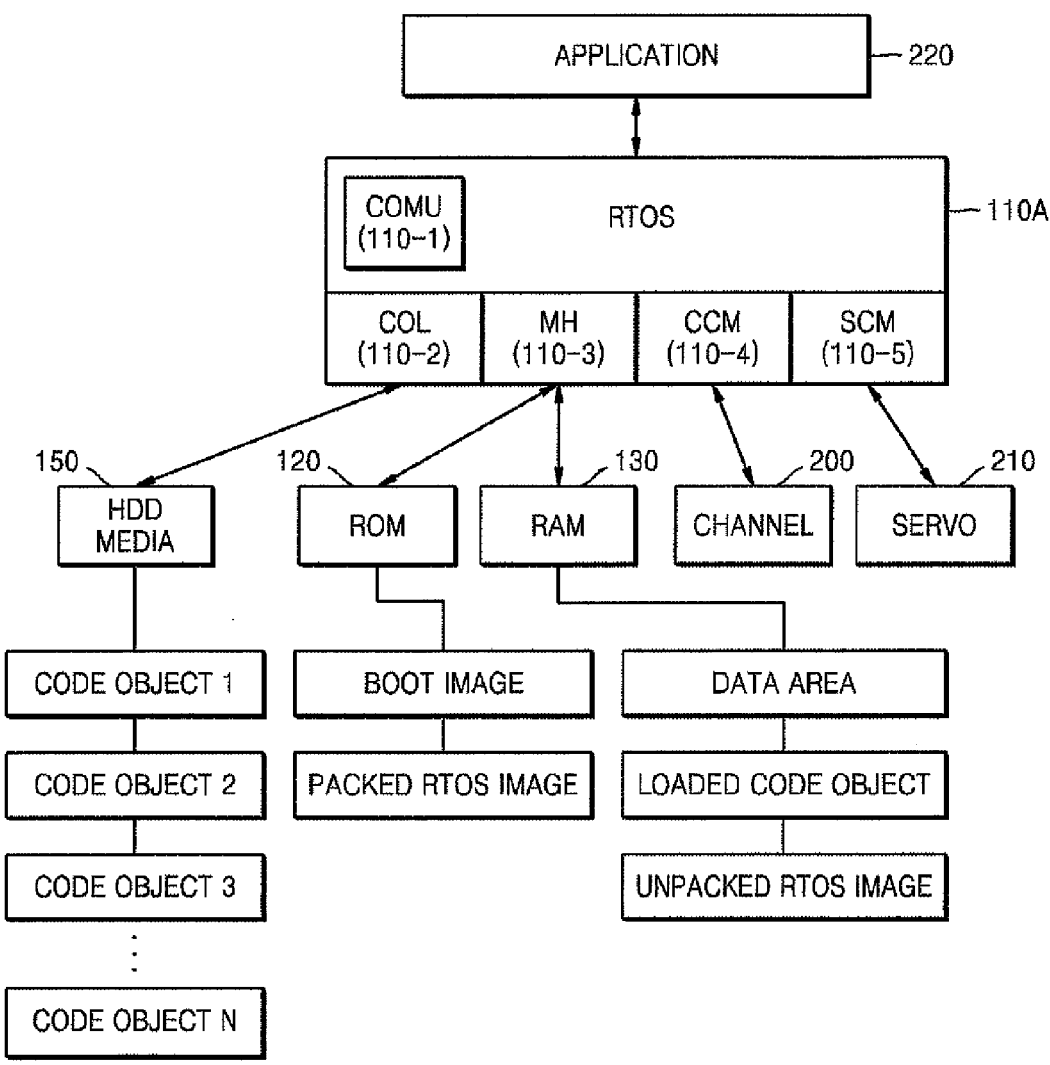
FIG. 2 is a function block diagram illustrating an operation system of software of the data storage device of FIG. 1, according to an embodiment of the inventive concept.

FIG. 2 is a functional block diagram of a software operation system of the data storage device of FIG. 1, according to an embodiment of the inventive concept. Referring to FIG. 2, multiple code objects 1 through N are stored in the media 150 of the HDD. A boot image and a packed real time operating system (RTOS) image are stored in the ROM 120.

More particularly, the code objects 1 through N are stored in the media 150, e.g., a disk, of the HDD. The code objects 1 through N stored in the disk may include not only code objects required for operating the disk drive, but also code objects relevant to various extendible functions of the disk drive. For example, the code objects for executing the methods of controlling a motor, as illustrated in FIGS. 9 through 11, for example, are stored in the disk. Alternatively, the code objects for executing the methods of controlling the motor may be stored in the ROM 120, instead of the disk used as the media 150 of the HDD. Also, code objects for executing various functions such as a MP3 player function, a navigation function, a video game function, or the like, may also be stored in the disk.

An unpacked RTOS image obtained by reading a boot image from the ROM 120 is loaded into the RAM 130 while booting the data storage device. Then, code objects required for operating the host I/F 160 and the external I/F 180 and stored in the media 150 of the HDD are loaded into the RAM 130. A data area for storing data is also allocated in the RAM 130.

A channel circuit 200 includes circuits for processing signals to read or write data. A servo circuit 210 includes circuits for controlling the head disk assembly 100 to read or write data.

An RTOS 110A is a real-time operation system program, e.g., a multiple program operating system using a disk. Depending on tasks, real-time multi-processing is performed on relatively high priority foreground tasks, and batch-processing is performed on relatively low priority background tasks. In addition, the RTOS 110A loads code objects to the disk or unloads code objects from the disk.

The RTOS 110A manages a code object management unit (COMU) 110-1, a code object loader (COL) 110-2, a memory handler (MH) 110-3, a channel control module (CCM) 110-4, and a servo control module (SCM) 110-5 to execute tasks according to requested commands. Also, the RTOS 110A manages application programs 220. More particularly, the RTOS 110A loads code objects required for controlling the disk drive into the RAM 130 when the disk drive is booted. Thus, after the execution of the booting process, the disk drive may be operated using the code objects loaded into the RAM 130.

The COMU 110-1 stores position information about where code objects are written, converts virtual addresses into actual addresses, and performs a bus arbitration process. The COMU 110-1 also stores information about priorities of tasks being executed. The COMU 110-1 also manages task control block (TCB) information and stack information required for executing tasks regarding code objects.

The COL 110-2 loads the code objects stored in the media 150 of the HDD into the RAM 130 using the COMU 110-1, or unloads the code objects stored in the RAM 130 to the media 150 of the HDD. Thus, the COL 110-2 may load the code objects for executing the methods of FIGS. 9 through 11, for example, and stored in the media 150 of the HDD into the RAM 130. The RTOS 110A may execute the methods of FIGS. 9 through 11 using the code objects loaded to the RAM 130, as described below.

The MH 110-3 writes data to or reads data from the ROM 120 or the RAM 130. The CCM 110-4 performs channel controlling required for processing a signal to write or read data. The SCM 110-5 controls a servo system, including the head disk assembly 100 for reading/writing data.

Figure 4:
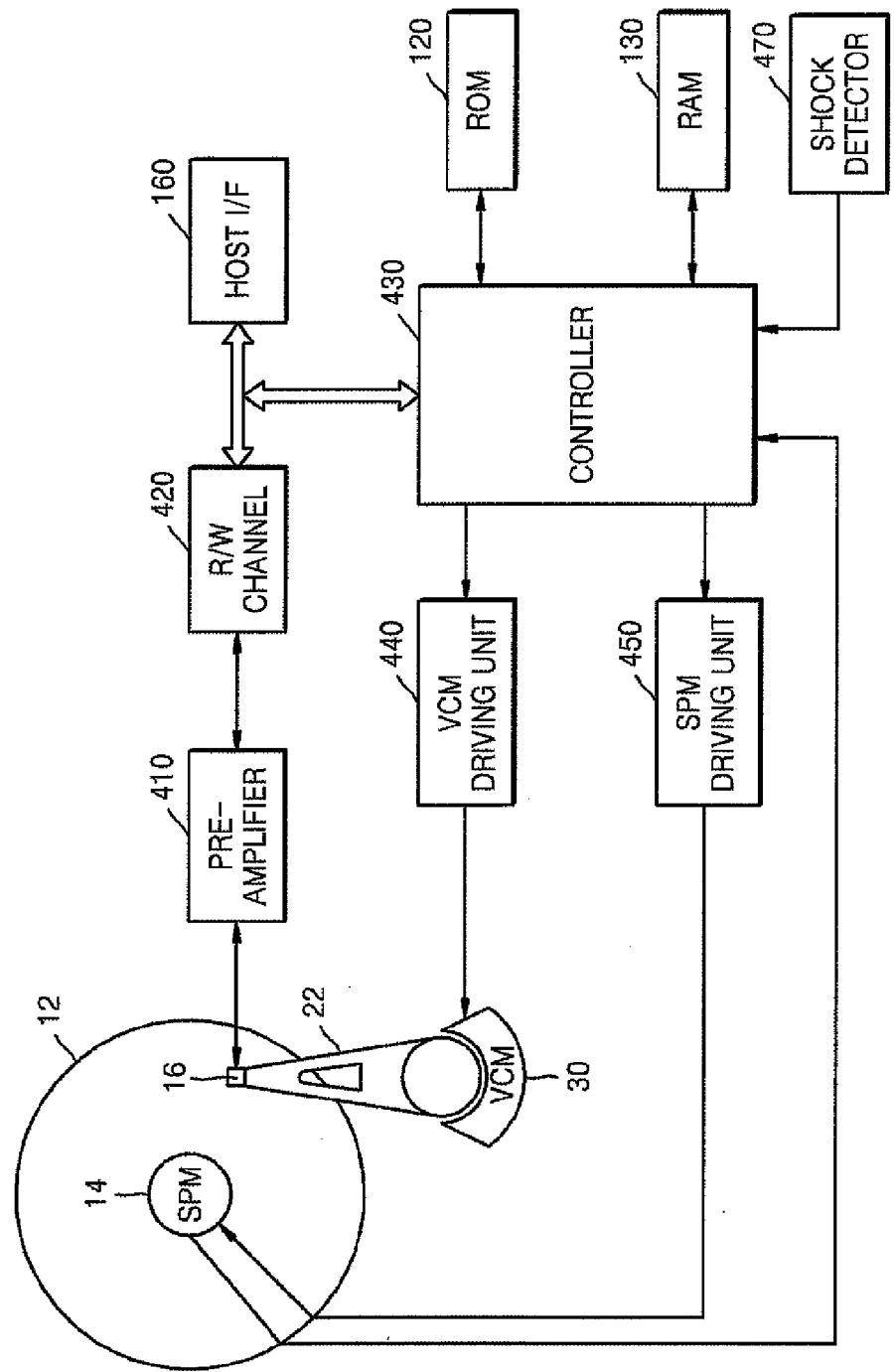
FIG. 4 is a block diagram of a disk drive, according to an embodiment of the inventive concept.

Referring to FIG. 4, the disk drive according to an embodiment of the inventive concept includes a pre-amplifier 410, a read/write (R/W) channel 420, a controller 430, a VCM driving unit 440, an SPM driving unit 450, a shock detector 470, the ROM 120, the RAM 130, and the host I/F 160.

The shock detector 470 detects the amplitude of a disturbance (or the amount of a shock) applied to the disk drive using a sensor, such as a piezoelectric sensor or an acceleration sensor, and outputs information about the amplitude of the disturbance to the controller 430.

The controller 430 may be a digital signal processor (DSP), a microprocessor, a microcontroller, a processor, or the like. The controller 430 controls the R/W channel 420 to read data from the disk 12 or to write data to the disk 12 according to a command received from the host device 170 via the host I/F 160. The controller 430 is coupled to the VCM driving unit 440, which supplies a driving current to drive the VCM 30. The controller 430 supplies a control signal to the VCM driving unit 440 to control movement of the head 16. Also, the controller 430 is coupled to the SPM driving unit 450, which supplies a driving current for driving the SPM 14. When power is supplied to the controller 430, the controller 430 supplies a control signal to the SPM driving unit 450 to rotate the SPM 14 at a target speed.

The controller 430 is coupled to the ROM 120 and the RAM 130. In the ROM 120, firmware and control data for controlling the disk drive are stored. Also, program codes and data for executing the methods of FIGS. 9 through 11, according to embodiments of the inventive concept, are stored in the ROM 120. However, the program codes and data may be stored in the maintenance cylinder area of the disk 12, instead of in the ROM 120. The controller 430 may also control the SPM 14, for example, according to the methods of FIGS. 9 through 11, using the program codes and information stored in the ROM 120 or the maintenance cylinder area of the disk 12.

Next, a data read operation and a data write operation in a general disk drive will be described below.

In a data read mode, the pre-amplifier 410 of the disk drive amplifies an electric signal sensed from the disk 12 by the head 16. Then, the R/W channel 420 amplifies the electrical signal output from the pre-amplifier 410 using an automatic gain control circuit (not shown) that automatically varies a gain according to an amplitude of the electrical signal, converts the electrical signal into a digital signal, and decodes the digital signal to detect data. For example, an error correction process may be performed on the detected data by the controller 430 using a Reed-Solomon code, which is an error correcting code, and the detected data may then be converted into stream data and transmitted to the host device 170 via the host I/F 160.

In a write mode, the disk drive receives data from the host device 170 via the host I/F 160, and the controller 430 adds an error correction symbol using a Reed-Solomon code, and the R/W channel 420 encodes the data to be suitable for a write channel. Then, the data is written to the disk 12 by the head 16 to which a write current amplified by the pre-amplifier 410 is applied.

An embodiment of executing the methods of controlling a motor in a disk drive will now be described. For convenience of description, the methods are applied to the SPM 14, which rotates the disk 12. However, as would be apparent to one of ordinary skill in the art, the methods are not only applied to the SPM 14, but may also be applied to other various motors used in products other than the disk drive.

The controller 430 loads the program codes and information for executing the methods stored in the ROM 120 or the disk 12 into the RAM 130, and controls elements to perform the methods of FIGS. 9 through 11, for example, using the program codes and information loaded into the RAM 130.

Figure 6:
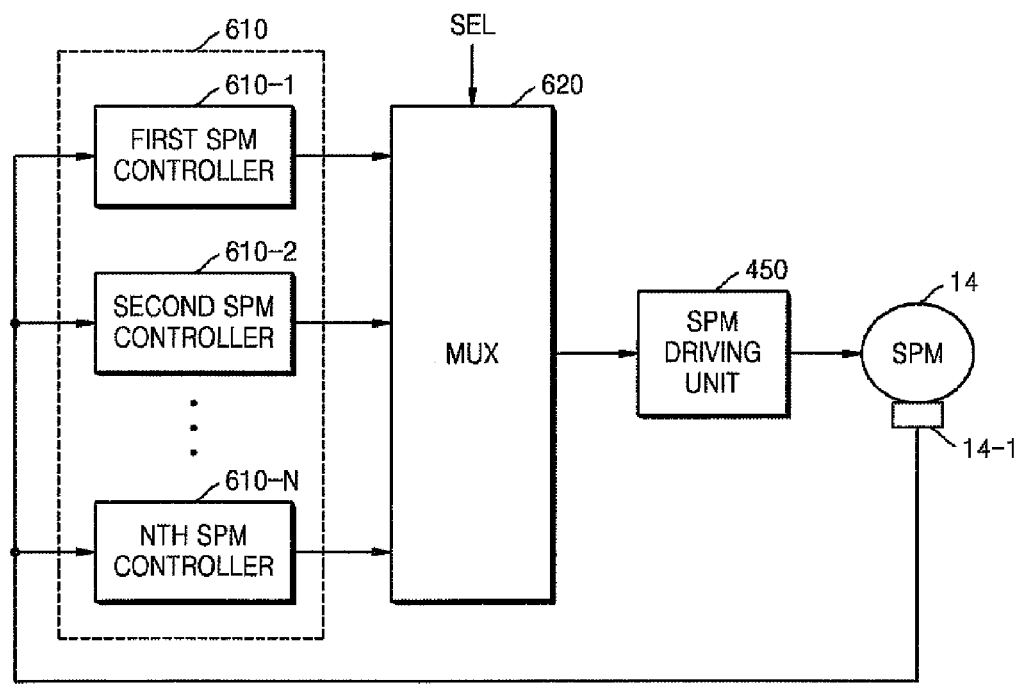
FIG. 6 is a block diagram of an apparatus for controlling a motor, according to an embodiment of the inventive concept.

FIG. 6 is a block diagram of an apparatus for controlling a motor, according to an embodiment of the inventive concept. The apparatus of FIG. 6 may be included in the processor 110 of FIG. 1 or the controller 430 of FIG. 4, or may be an individual circuit, according to various embodiments.

Referring to FIG. 6, the apparatus includes an SPM controller block 610, a multiplexer (MUX) 620, the SPM driving unit 450, the SPM 14, and a speed detector 14-1.

The speed detector 14-1 generates a speed detecting signal corresponding to a speed of the SPM 14 by using a counter electromotive force signal detected when the SPM 14 rotates. The SPM controller block 610 may include first through Nth SPM controllers 610-1 through 610-N having frequency response characteristics of different frequency bandwidths.

System responses of the first through Nth SPM controllers 610-1 through 610-N quicken as the frequency bandwidth increases. In other words, the frequency bandwidth is proportional to a response speed. Accordingly, as the frequency bandwidths of the first through Nth SPM controllers 610-1 through 610-N increase, the apparatus reacts more sensitively to a disturbance, although a jitter component of the SPM 14 also increases. Likewise, as the frequency bandwidths of the first through Nth SPM controllers 610-1 through 610-N decrease, the jitter component decreases, but the apparatus reacts less sensitively to a disturbance, and thus the amount of a momentary drop in speed of the SPM 14 caused by the disturbance increases and the time required for the SPM 14 to return to a target speed increases with respect to a relatively large disturbance. Moreover, the jitter component of the SPM 14 generates a timing error in a track following mode of the disk drive, thereby increasing the possibility of error generation while reading or writing data. For example, the SPM controller block 610 may be designed by setting the frequency bandwidth of the first SPM controller 610-1 to the largest frequency bandwidth, setting the frequency bandwidth of the second SPM controller 610-2 to a smaller frequency bandwidth than the first SPM controller 610-1, and so on, and then setting the frequency bandwidth of the Nth SPM controller 610-N to the smallest frequency bandwidth.

The first through Nth SPM controllers 610-1 through 610-N included in the SPM controller block 610 each generate a speed control signal for controlling the SPM 14 to reach the target speed based on a speed error signal, according to a feedback control loop having frequency response characteristics of different frequency bandwidths. The speed error signal is the difference between a speed detecting signal generated by the speed detector 14-1 and an initially set target speed signal.

The MUX 620 selects one of the first through Nth SPM controllers 610-1 through 610-N included in the SPM controller block 610 by a selection signal SEL. In other words, output terminals of the first through Nth SPM controllers 610-1 through 610-N are respectively connected to input terminals of the MUX 620, and one of the input terminals of the MUX 620 is electrically conducted by the select signal SEL.

The controller 430 may generate the select signal SEL based on a condition of generating a load variation of the SPM 14. For example, the controller 430 may generate the select signal SEL for selecting one of the first through Nth SPM controllers 610-1 through 610-N according to the amplitude of the disturbance detected by the shock detector 470.

More particularly, the detected amplitude of a disturbance is classified into one of multiple ranges, where the ranges are classified according to the number of the first through Nth SPM controllers 610-1 through 610-N included in the SPM controller block 610. A table is prepared according to the ranges in which the detected amplitude of the disturbance are classified, such that the SPM controllers 610-1 through 610-N having larger frequency bandwidths correspond to larger disturbances. The prepared table may be stored in the ROM 120 or the disk 12. Accordingly, the table is prepared such that the first SPM controller 610-1 having the largest frequency bandwidth corresponds to the largest classified disturbance, and the Nth SPM controller 610-N having the smallest frequency bandwidth corresponds to the smallest classified disturbance.

The controller 430 determines which of the SPM controllers 610-1 through 610-N has a frequency bandwidth corresponding to the amplitude of the disturbance detected by the shock detector 470 using the table, and generates the select signal SEL for selecting the determined SPM controller. Alternatively, the controller 430 may generate the select signal SEL by evaluating the amount of interference generated between the head 16 and the disk 12 or the amount of load increase of the SPM 14. The amount of interference generated between the head 16 and the disk 12 may be detected by measuring the amount of change of bias force by a flexible cable (not shown) connecting the head 16 and the pre-amplifier 410. For example, the changed amount of bias force may be detected by measuring a changed amount of current applied to the VCM 30 or a changed amount of control signal of the VCM 30.

Alternatively, the controller 430 may generate the select signal SEL by considering a state of disturbance according to a mode to be performed in a system. For example, the select signal SEL may be generated such that an SPM controller having a relatively large frequency bandwidth is selected during a ramp loading period of the disk drive having a ramp loading system, and an SPM controller having a relatively small frequency bandwidth is selected during a read/write operation period after the ramp loading period is completed.

The MUX 620 selects one of the first through Nth SPM controllers 610-1 through 610-N according to the select signal SEL, and outputs the speed control signal generated by the selected SPM controller to the SPM driving unit 450. The SPM driving unit 450 generates a driving current corresponding to the input speed control signal and applies the driving current to the SPM 14. Thus, the SPM 14 is optimally controlled according to a state of disturbance by changing a frequency bandwidth of a frequency response characteristic of a SPM controller in consideration of the amplitude of a disturbance applied to the system or a mode to be performed in the system.

Figure 7:
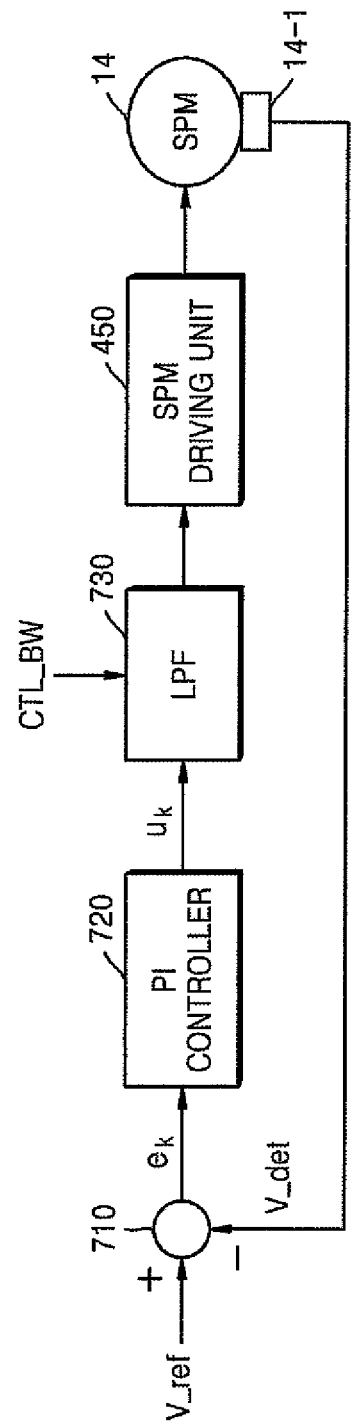
FIG. 7 is a block diagram of an apparatus for controlling a motor, according to another embodiment of the inventive concept.

FIG. 7 is a block diagram of an apparatus for controlling a motor, according to another embodiment of the inventive concept. The apparatus of FIG. 7 may be included in the processor 110 of FIG. 1 or the controller 430 of FIG. 4, or may be an individual circuit, according to various embodiments.

As shown in FIG. 7, the apparatus includes a subtractor 710, a proportional and integral (PI) controller 720, a low pass filter 730, the SPM driving unit 450, the SPM 14, and the speed detector 14-1. Although the PI controller 720 is depicted in the present embodiment of the inventive concept, any of various controllers may be incorporated.

The speed detector 14-1 generates a speed detecting signal V_det corresponding to the speed of the SPM 14 using a counter electromotive force signal detected when the SPM 14 rotates. The subtractor 710 outputs a speed error signal $e_k$ obtained by subtracting the speed detecting signal V_det generated by the speed detector 14-1 by a target speed signal V_ref, according to control intervals. The PI controller 720 then generates a speed control signal $u_k$ in control interval k according to Equation 1 below.

$$u_k = K_P \cdot e_k + K_I \cdot \Sigma e_k + K_{FF}$$ [Equation 1]

In Equation 1, $K_P$ denotes a proportional gain constant, $K_I$ denotes a storage gain constant, and $K_{FF}$ denotes a feedforward constant.

Figure 8:
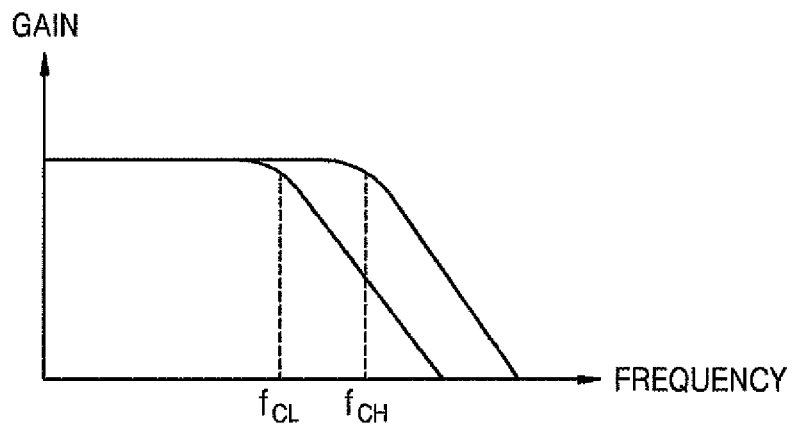
FIG. 8 is a graph showing a frequency response characteristic of a low pass filter of FIG. 7, according to an embodiment of the inventive concept.

The low pass filter 730 filters and outputs the speed control signal $u_k$ generated by the PI controller 720 based on a frequency response characteristic of a frequency bandwidth determined according to a bandwidth control signal CTL_BW. The bandwidth control signal CTL_BW varies a parameter value for determining a cut-off frequency of the low pass filter 730. FIG. 8 is a graph showing a representative frequency response characteristic of the low pass filter 730 of FIG. 7, showing low and high cut-off frequencies $f_{CL}$ and $f_{CH}$. Although the low pass filter 730 is depicted in the present embodiment, a band pass filter may be used instead in some circumstances.

The controller 430 may generate the bandwidth control signal CTL_BW for setting the frequency bandwidth of the low pass filter 730. The bandwidth control signal CTL_BW may be generated such that the frequency bandwidth of the low pass filter 730 is set in consideration of the amplitude of the disturbance applied to a system or a state of disturbance according to a mode to be performed in the system. For example, the bandwidth control signal CTL_BW may be generated to increase the frequency bandwidth of the low pass filter 730 in proportion to the amplitude of the detected disturbance.

Alternatively, the controller 430 may generate the bandwidth control signal CTL_BW in consideration of a state of disturbance according to a mode to be performed in the system. For example, in a disk drive having a ramp loading system, the bandwidth control signal CTL_BW may be generated such that the frequency bandwidth is set relatively high during a ramp loading period, and is set relatively small during a data read/write operating period after the ramp loading period is completed.

The SPM driving unit 450 generates a driving current corresponding to the speed control signal $u_k$ filtered by the low pass filter 730, and applies the driving current to the SPM 14. Thus, the SPM 14 is optimally controlled according to a state of disturbance by changing a frequency bandwidth of the low pass filter 730 in consideration of the size of a disturbance applied to the system or the state of disturbance according to a mode to be performed in the system.

Methods of controlling a motor, according to embodiments of the inventive concept, will now be described with reference to FIGS. 9 through 11. The methods may be performed by the processor 110 of FIG. 1 or the controller 430 of FIG. 4, for example. For convenience of explanation, it is assumed that the methods are performed by the controller 430 in the following description, but the inventive concept is not limited thereto.

FIG. 9 is a flowchart illustrating a method of controlling a motor, according to an embodiment of the inventive concept.

Referring to FIG. 9, the controller 430 detects a state of disturbance applied to a motor control system in operation S110. The motor control system may include an SPM control system, and the state of disturbance may be detected using the shock detector 470. Alternatively, the state of disturbance may be predicted by considering the state of disturbance according to a mode to be performed in the motor control system.

In operation S120, the controller 430 analyzes the state of disturbance detected by the shock detector 470 or the state of disturbance according to the mode to be performed in the motor control system. In an embodiment, the controller 430 determines whether the amplitude of the disturbance detected by the shock detector 470 exceeds a threshold value or whether the mode to be performed in the motor control system is a mode that generates a state of disturbance exceeding the threshold value. An example of a mode that generates a state of disturbance exceeding the threshold value may include a ramp loading mode in a disk drive having a ramp loading system.

Then, the controller 430 determines a frequency bandwidth of the motor control system based on a result of analyzing the state of disturbance in operation S130. In other words, the frequency bandwidth of the motor control system is determined such that the frequency bandwidth is increased in proportion to the amplitude of the disturbance applied to the motor control system. If the amplitude of the disturbance applied to the motor control system exceeds an initially set threshold value, the controller 430 may determine the frequency bandwidth of the motor control system to be a relatively large frequency bandwidth (BW_HIGH), and if not, the controller 430 may determine the frequency bandwidth to be a relatively small frequency bandwidth (BW_LOW) less thin the relatively large frequency bandwidth BW_HIGH. For example, the controller 430 determines the frequency bandwidth of the motor control system to be bandwidth BW_HIGH during a ramp loading mode executing period in a disk drive having a ramp loading system, and to be bandwidth BW_LOW during a data read/write mode executing period.

In operation S140, the speed of the SPM 14 is controlled to reach a target speed by applying the frequency bandwidth determined in operation S130. As such, the SPM 14 is optimally controlled according to the state of disturbance by changing the frequency bandwidth of the motor control system in consideration of the amplitude of the disturbance applied to the motor control system or the state of disturbance according to the mode to be performed in the motor control system.

Methods of controlling the SPM 14 using the apparatus of FIG. 6 or FIG. 7 for a disk drive, when the number of variable frequency bandwidths in the apparatus is limited to two, will now be described with reference to FIGS. 10 and 11, according to embodiments of the inventive concept.

Because the number of variable frequency bandwidths is limited to two, a cut-off frequency of a closed loop frequency response characteristic of the motor control system may be $f_{CL}$ or $f_{CH}$. The frequency bandwidth is bandwidth BW_LOW when the cut-off frequency is selected to be $f_{CL}$, and the frequency bandwidth is bandwidth BW_HIGH when the cut-off frequency is selected to be $f_{CH}$. Accordingly, it is determined that the bandwidth BW_HIGH is higher than the bandwidth BW_LOW.

FIG. 10 is a flowchart illustrating a method of controlling a motor, according to another embodiment of the inventive concept.

Referring to FIG. 10, a disk drive is initialized by turning on the disk drive in operation S210. A frequency bandwidth BW of an SPM controller is set from an initialization state to bandwidth BW_HIGH in operation S220.

The controller 430 activates the SPM 14 in operation S230. For example, while the SPM 14 is stationary, a driving current is supplied to the SPM 14 for a predetermined period of time under an open loop control so that the SPM 14 reaches a measurable speed that is lower than a target speed. The speed of the SPM 14 is then controlled to reach the target speed by performing closed loop control. After activating the SPM 14, the controller 430 determines whether the speed of the SPM 14 has reached the target speed in operation S240.

When the speed of the SPM 14 reaches the target speed, the controller 430 performs a loading process to load the head 16 in the parking area onto the disk 12 in operation S250. For example, the controller 430 performs the loading process by generating a VCM driving control signal for moving the head 16 in the ramp parking unit 38 onto the disk 12 in the disk drive according to a ramp loading operation. While the loading process is performed, the load of the SPM 14 increases due to a disturbance generated in response to interference between the head 16 and the disk 12. However, because the frequency bandwidth BW of the motor control system is set to bandwidth BW_HIGH, which is relatively large, the motor control system reacts sensitively to the disturbance. Thus, the amount of instantaneous reduction in the speed of the SPM 14 due to the disturbance is reduced, or the instantaneous reduction in speed may be substantially prevented. Likewise, the reduced speed of the SPM 14 return to the target speed more quickly.

After performing the loading process, the controller 430 determines whether a first seek operation is completed in operation S260. In other words, after moving the head 16 onto the disk 12, it is determined whether the first seek operation of moving the head 16 located on the disk 12 to an initially set track is completed. Here, the initially set track may be a track included in the maintenance cylinder area of the disk storing information about the disk drive.

If it is determined in operation S260 that the first seek operation is completed after the loading process, the controller 430 changes the frequency bandwidth BW of the motor control system from bandwidth BW_HIGH to bandwidth BW_LOW in operation S270. Accordingly, the speed of the SPM 14 is controlled by the motor control system having bandwidth BW_LOW. After the first seek operation is completed, the disk drive may perform a data read or write operation according to a command received from a host device. After the loading process is completed, the possibility of a large disturbance being generated in the disk drive itself is small, except for as a result of an external impact. Accordingly, during the data read or write operation, the SPM 14 is controlled after decreasing the frequency bandwidth, so that the SPM 14 reacts less sensitively to any disturbance, in order to reduce a jitter component of the SPM 14.

Accordingly, the frequency bandwidth BW of a frequency response characteristic in the motor control system is set to bandwidth BW_HIGH, which is relatively high, before the loading operation is completed, so that the motor control system reacts sensitively to disturbances, where a relatively large disturbance is expected to be generated in the disk drive during the loading operation. The frequency bandwidth BW is changed to bandwidth BW_LOW, which is relatively low, after the loading operation is completed, so that the jitter component of the SPM 14 is reduced by reacting less sensitively to disturbances. Therefore, the frequency bandwidth BW is set to bandwidth BW_LOW in a section when the data read or write operation is performed, and thus the motor control system reacts less sensitively to disturbances. Reducing the jitter component of the SPM 14 reduces errors.

Figure 12:
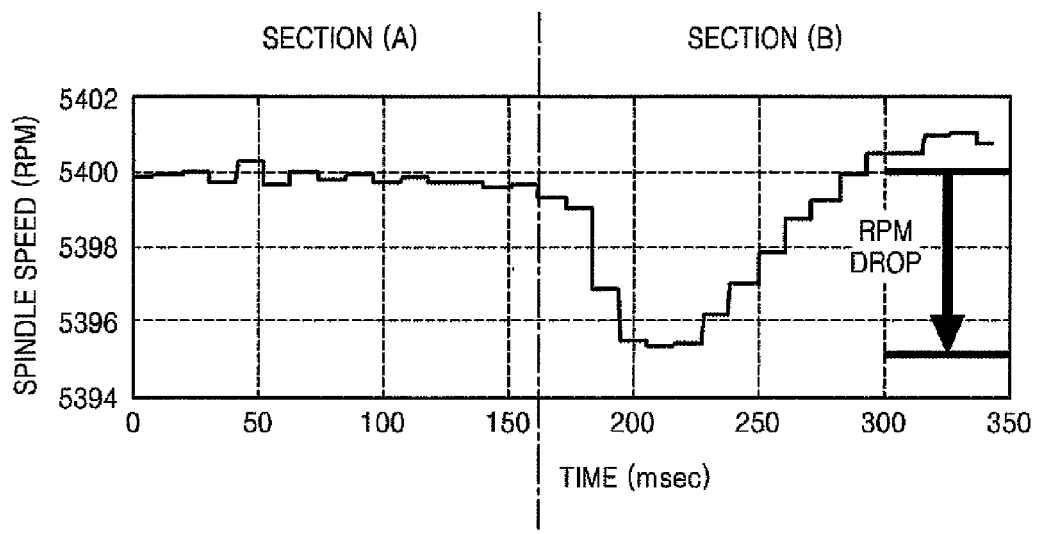
FIG. 12 is a graph of a speed trajectory of a spindle motor controlled by setting a frequency bandwidth of a spindle motor controller to a low bandwidth, such as 8 Hz, while a disk drive performs a ramp loading operation.
Figure 13:
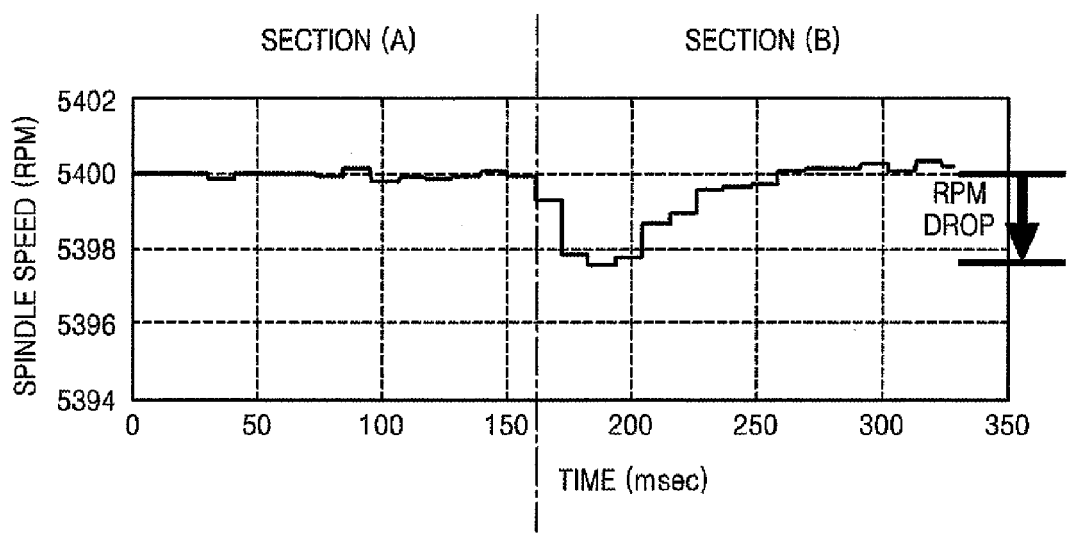
FIG. 13 is a graph of a speed trajectory of a spindle motor controlled by setting a frequency bandwidth of a spindle motor controller to a high bandwidth, such as 16 Hz, while a disk drive performs a ramp loading operation.

FIGS. 12 and 13 are graphs showing changes in speed of the SPM 14 according to the frequency bandwidth BW of the motor control system, while the disk drive performs a ramp loading operation.

More particularly, FIG. 12 is a graph of the speed trajectory of the SPM 14 when the SPM 14 is controlled by setting the frequency bandwidth BW of the motor control system to bandwidth BW_LOW, such as 8 Hz, for example. FIG. 13 is a graph of the speed trajectory of the SPM 14 when the SPM 14 is controlled by setting the frequency bandwidth BW of the motor control system to bandwidth BW_HIGH, such as 16 Hz, for example.

In each of FIGS. 12 and 13, SECTION (A) indicates the section in which the head 16 is located on the ramp parking unit 38 during the ramp loading operation, and SECTION (B) indicates the section in which the head 16 is located on the disk 12. In SECTION (B), the load of the SPM 14 instantaneously increases due to interference generated between the head 16 and the disk 12 during the ramp loading operation, and thus the speed of the SPM 14 temporarily decreases, the magnitude of which is indicated by RPM DROP.

Comparison of FIGS. 12 and 13 shows that the temporary reduction in speed of the SPM 14 when the frequency band BW is set to 16 Hz (bandwidth BW_HIGH), shown in FIG. 13, is less than the temporary reduction in speed of the SPM 14 when the frequency bandwidth BW is set to 8 Hz (bandwidth BW_LOW), shown in FIG. 12. Also, the temporarily reduced speed recovers to a target speed, e.g., about 5400 RPM, more quickly when the frequency band BW is set to 16 Hz (bandwidth BW_HIGH) than when the frequency bandwidth BW is set to 8 Hz (bandwidth BW_LOW).

For reference, since the frequency bandwidth BW of a motor control system having a fixed frequency bandwidth is determined considering the jitter quality of the SPM 14 in read/write mode, the frequency bandwidth BW is 8 Hz (bandwidth BW_LOW). In this case, as shown in FIG. 12, the speed of the SPM 14 drops a relatively large amount from the target speed during the ramp loading operation, and it takes a relatively long time for the speed to return to the target speed. Therefore, a servo signal may be read inaccurately, or worse, the floating height of the head 16 may be unstable during the ramp loading operation.

However, the ability to select one of two different frequency bandwidths, i.e., bandwidth BW_LOW (such as 8 Hz) or bandwidth BW_HIGH (such as 16 Hz), as the frequency bandwidth BW in the motor control system based on the state of disturbance of the mode to be performed in the disk drive, e.g., according to the method of FIG. 10, enables switching to the higher bandwidth BW_HIGH during modes in which disturbance is relatively high, such as a ramp loading operation. Therefore, the temporary decrease in speed of the SPM 14 may be reduced or prevented. Further, performance of the disk drive may be improved by reducing the jitter component of the SPM 14 by switching to the lower bandwidth BW_LOW during modes in which disturbance is relatively low, such as a data read/write mode.

FIG. 11 is a flowchart illustrating a method of controlling a motor, according to another embodiment of the inventive concept.

For reference, in the method of FIG. 10, the frequency bandwidth BW of the motor control system is changed in consideration of the state of disturbance of the mode to be performed in the disk drive. In comparison, in the method of FIG. 11, the state of disturbance applied to the disk drive is detected directly, and the frequency bandwidth BW of the motor control system is changed according to the detected state of disturbance. The method of FIG. 11 will now be described in detail.

In operation S310, the controller 430 determines whether the SPM 14 is in a "control on" state in the disk drive. In other words, it is determined whether the motor control system is in a closed loop control state for receiving a signal related to the speed of the SPM 14 and controlling the SPM 14 to reach a target speed.

When it is determined that the SPM 14 is in the "control on" state in operation S310, a disturbance applied to the disk drive is detected and value $d_k$ of the detected disturbance is calculated in operation S320. For example, the disturbance applied to the disk drive may be detected using a sensor, such as a piezoelectric sensor or an acceleration sensor, and then the value $d_k$ of the detected disturbance may be calculated. Alternatively, the value $d_k$ may be calculated based on the amount of interference generated between the head 16 and the disk 12. The amount of interference may be calculated by measuring the amount of change of bias force by the flexible cable connecting the head 16 and the pre-amplifier 410. For example, the amount of change of bias force may be detected by measuring the amount of change in current applied to the VCM 30 or the amount of change in a control signal of the VCM 30.

Next, the value $d_k$ and a threshold value TH are compared in operation S330. The threshold value TH is the value of disturbance that requires the frequency bandwidth BW to change between two different frequency bandwidths, e.g., bandwidth BW_LOW (such as 8 Hz) and bandwidth BW_HIGH (such as 16 Hz).

When it is determined that the value $d_k$ is greater than the threshold value TH in operation S330, the frequency bandwidth BW of the motor control system is set to bandwidth BW_HIGH in operation S340. When it is determined that the value $d_k$ is not greater than the threshold value TH in operation S330, the frequency bandwidth BW of the motor control system is set to bandwidth BW_LOW in operation S350. Accordingly, one of the two available bandwidths BW_HIGH and BW_LOW is selected as the frequency bandwidth BW in the motor control system, based on the amplitude of the disturbance detected in the disk drive.

In an embodiment, the frequency bandwidth BW of the motor control system is determined according to the size of the disturbance. Alternatively, the frequency bandwidth BW may be determined by determining a state of disturbance based on a difference between the speed of the SPM 14 and the target speed. In other words, if the difference between the speed of the SPM 14 and the target speed exceeds a threshold value, the frequency bandwidth BW of the motor control system may be set to bandwidth BW_HIGH, and if not, the frequency bandwidth BW of the motor control system may be set to bandwidth BW_LOW.

Further, in an embodiment, the frequency bandwidth BW may be determined based on the amount of jitter detected in the SPM 14. For example, the jitter value of the SPM 14 may be calculated by measuring the time interval of servo information generation, or by measuring the time interval of detecting an SAM. However, in this case, the frequency bandwidth BW of the motor control system is set to the bandwidth BW_LOW when the jitter value of the SPM 14 exceeds a threshold value, and otherwise is set to bandwidth BW_HIGH.

The SPM 14 may be controlled by applying one or both of the methods of FIGS. 10 and 11 to the disk drive. For example, the SPM 14 may be controlled by using the method of FIG. 10 after the disk drive performs the ramp loading operation until the first seek operation is completed, and using the method of FIG. 11 during the data read/write operation afterwards.

While the inventive concept has been described with reference to exemplary embodiments, the exemplary embodiments should be considered in a descriptive sense only, and not for purposes of limitation. Thus, it will be apparent to those skilled in the art that various changes and modifications may be made without departing from the spirit and scope of the present invention. Therefore, it should be understood that the above embodiments are not limiting, but illustrative.

What is claimed is:

1. A method of controlling a motor, comprising:
    changing a frequency bandwidth of a frequency response characteristic in a motor control system according to a state of a disturbance applied to the motor control system; and
    controlling a speed of the motor by applying the changed frequency bandwidth to the motor control system.

2. The method of claim 1, wherein the motor comprises a spindle motor for rotating a disk.

3. The method of claim 1, further comprising:
    determining the state of disturbance using at least one factor value based on at least one of a disturbance value detected by a shock detecting sensor, an amount of interference generated between a head and a disk, a difference between a measured speed of the motor and a target speed, and a jitter value of a spindle motor, wherein the frequency bandwidth of the frequency response characteristic in the motor control system is changed based on the determination.

4. The method of claim 1, wherein changing the frequency bandwidth comprises increasing the frequency bandwidth in proportion to an amplitude of the disturbance applied to the motor control system.

5. The method of claim 1, wherein changing the frequency bandwidth comprises setting the frequency bandwidth to a first frequency bandwidth when an amplitude of the disturbance applied to the motor control system exceeds an initially set threshold value, and otherwise setting the frequency bandwidth to a second frequency bandwidth, which is less than the first frequency bandwidth.

6. The method of claim 1, wherein changing the frequency bandwidth comprises setting the frequency bandwidth to a first frequency bandwidth while a disk drive having a ramp loading system is in a ramp loading period, and setting the frequency bandwidth to a second frequency bandwidth smaller than the first frequency bandwidth while the disk drive is in a data read or write operation period.

7. The method of claim 1, wherein changing the frequency bandwidth comprises setting the frequency bandwidth to a first frequency bandwidth until a first seek operation according to a ramp loading operation of a disk drive having a ramp loading system is completed, and setting the frequency bandwidth to a second frequency bandwidth smaller than the first frequency bandwidth after the first seek operation is completed.

8. An apparatus for controlling a motor, comprising:
a speed detector for detecting a speed of the motor;
a plurality of motor controllers, each for generating a speed control signal to reach a target speed based on the detected speed of the motor, according to frequency response characteristics of different frequency bandwidths;
a selector for selecting one of the plurality of motor controllers based on a disturbance that generates a load variation of the motor; and
a motor driver for generating a driving current based on the speed control signal generated by the motor controller selected by the selector, and applying the generated driving current to the motor.

9. The apparatus of claim 8, wherein the selector selects a motor controller that has a frequency response characteristic of a relatively large frequency bandwidth that is proportional to an amplitude of the disturbance that generates the load variation of the motor.

10. The apparatus of claim 8, wherein the plurality of motor controllers comprise a first motor controller having a frequency response characteristic of a first frequency bandwidth, and a second motor controller having a frequency response characteristic of a second frequency bandwidth smaller than the first frequency bandwidth, and
wherein the selector selects the first motor controller when an amplitude of the disturbance generating the load variation of the motor exceeds a threshold value, and selects the second motor controller when the amplitude of the disturbance generating the load variation of the motor does not exceed the threshold value.

11. The apparatus of claim 10, wherein the amplitude of the disturbance generating the load variation of the motor exceeding the threshold value comprises a ramp loading executing condition in a disk drive having a ramp loading system.

12. The apparatus of claim 8, wherein the selector selects one of the plurality of motor controllers based on a state of the disturbance determined using at least one factor value based on at least one of a disturbance value detected by a shock detecting sensor, an amount of interference generated between a head and a disk, a difference between a measured speed of the motor and a target speed, and a jitter value of a spindle motor.

13. An apparatus for controlling a motor, comprising:
a speed detector for detecting a speed of the motor;
a subtractor for subtracting a speed error corresponding to a difference between the detected speed of the motor and a target speed;
a speed controller for generating a speed control signal corresponding to the speed error;
a filter for changing a frequency bandwidth based on a disturbance generating a load variation of the motor, and for filtering and outputting the speed control signal according to a frequency response characteristic of the changed frequency bandwidth; and
a motor driving unit for generating a driving current corresponding to the speed control signal filtered and output by the filter, and for supplying the driving current to the motor.

14. The apparatus of claim 13, wherein the filter comprises a low pass filter.

15. The apparatus of claim 13, wherein the filter filters according to a frequency response characteristic of a first frequency bandwidth when an amplitude of the disturbance generating the load variation of the motor exceeds a threshold value, and filters according to a frequency response characteristic of a second frequency bandwidth smaller than the first frequency bandwidth when the amplitude of the disturbance generating the load variation of the motor does not exceed the threshold value.

16. The apparatus of claim 15, wherein the amplitude of the disturbance generating the load variation of the motor exceeding the threshold value results from a ramp loading executing condition in a disk drive having a ramp loading system.

17. A disk drive comprising:
a disk for storing information;
a spindle motor for rotating the disk;
a spindle motor controller for changing a frequency bandwidth based on a disturbance condition generating a load variation of the spindle motor, and generating a speed control signal based on a difference between a speed of the spindle motor and a target speed by applying a frequency response characteristic of the changed frequency bandwidth; and
a spindle motor driving unit for generating a driving current corresponding to the speed control signal and applying the generated driving current to the spindle motor.

18. The disk drive of claim 17, wherein the frequency bandwidth is determined to be a first frequency bandwidth when amplitude of a disturbance changing a load of the spindle motor exceeds a threshold value, and is determined to be a second frequency bandwidth smaller than the first frequency bandwidth when the amplitude of the disturbance changing the load of the spindle motor does not exceed the threshold value.

19. The disk drive of claim 17, wherein the spindle motor controller determines the frequency bandwidth to be a first frequency bandwidth during a ramp loading executing period, wherein a head mounted on a ramp structure of the disk drive is moved onto the disk, and determines the frequency bandwidth to be in a second frequency bandwidth smaller than the first frequency bandwidth after the ramp loading executing period.

* * * * *